(12) United States Patent
Kung et al.

(10) Patent No.: US 6,772,224 B2
(45) Date of Patent: Aug. 3, 2004

(54) METHOD AND SYSTEM FOR PROCESSING LOAD DISTRIBUTION FOR A PACKETIZED TELECOMMUNICATION NETWORK ENTITY

(75) Inventors: Lingli Kung, Dallas, TX (US); Chao-Yee Kuan, Plano, TX (US); Lu Tian, Plano, TX (US); Ching-Der Lin, Plano, TX (US); Ghassan Naim, Garland, TX (US); Seshagiri R. Madhavapeddy, Richardson, TX (US); Pardeep Kohli, Plano, TX (US); Anuj Jain, Southlake, TX (US)

(73) Assignee: Spatial Communications Technologies, Inc., Richardson, TX (US)

( * ) Notice: Subject to any disclaimer, the term of this patent is extended or adjusted under 35 U.S.C. 154(b) by 399 days.

(21) Appl. No.: 09/935,228

(22) Filed: Aug. 22, 2001

(65) Prior Publication Data

US 2003/0053473 A1 Mar. 20, 2003

(51) Int. Cl.[7] .......................... G06F 15/173; H04L 12/28
(52) U.S. Cl. .......................... 709/238; 709/201; 370/232
(58) Field of Search .................................. 709/201, 238, 709/242; 370/229, 232, 351

(56) References Cited

U.S. PATENT DOCUMENTS

| | | | |
|---|---|---|---|
| 5,371,852 A | * | 12/1994 | Attanasio et al. ........... 709/245 |
| 5,721,819 A | * | 2/1998 | Galles et al. ................ 709/243 |
| 5,999,518 A | | 12/1999 | Nattkemper et al. |
| 6,069,895 A | | 5/2000 | Ayandeh |
| 6,081,506 A | | 6/2000 | Buyukkoc et al. |
| 6,119,143 A | * | 9/2000 | Dias et al. ................... 709/201 |
| 6,185,619 B1 | | 2/2001 | Joffe et al. |
| 6,243,360 B1 | | 6/2001 | Basilico |
| 6,253,230 B1 | * | 6/2001 | Couland et al. ............. 709/203 |
| 6,263,368 B1 | | 7/2001 | Martin |
| 6,272,522 B1 | | 8/2001 | Lin et al. |
| 2002/0166080 A1 | * | 11/2002 | Attanasio et al. .............. 714/15 |
| 2002/0184376 A1 | * | 12/2002 | Sternagle ...................... 709/230 |

* cited by examiner

*Primary Examiner*—Krisna Lim
(74) *Attorney, Agent, or Firm*—Haynes and Boone, LLP

(57) ABSTRACT

A method and system is provided for routing at least one message from one or more subscribers of a communications network in a network node, the network node having a plurality of processing cards (Pcards). First, at least one Pcard is designated to service messages from a predetermined set of subscribers. When receiving a message from a subscriber of the predetermined set, the Pcard that is designated for the subscriber is determined and the received message is routed to the determined Pcard. The Pcard also has an associated database containing profile information for the subscribers using the Pcard.

26 Claims, 9 Drawing Sheets

METHOD AND SYSTEM FOR PROCESSING LOAD DISTRIBUTION FOR A PACKETIZED TELECOMMUNICATION NETWORK ENTITY

BACKGROUND OF THE INVENTION

The present invention relates in general to software design and system architecture for a telecommunication node, and more particularly, to a software development, system architecture and message distribution function in a data telecommunication network node for supporting a large number of subscribers in an optimal and efficient fashion.

In many telecommunication systems, the performance of a network node such as a switch is judged by its capacity and speed in handling simultaneous calls. That is, a benchmark for the node may be the maximum number of calls that it can handle at any given time capacity. Therefore, the processing speed of the network node plays a major feature of such a product, and often determines its market acceptability. Taking the switch as an example, depending on a geographical area in which the switch is deployed, the capacity of the switch may be required to handle from a few hundred thousand to a few millions calls. It is also important for the switch to have an efficient scalability property so that it can meet any deployment capacity requirements. For example, if there is a need for adding one million new users to an existing switch, a mechanism is desired to expand the capacity of the switch. In addition, the switch needs to be designed for its ease to "scale up" efficiently (i.e., with minimal cost in terms of adding new elements or redesign of the switch system) in order to support future changes in capacity requirements.

What is needed is an efficient method and system for handling incoming messages with minimum processing delay. Further, what is needed is a method and system having good scalability without loosing efficiency in handling large numbers of calls.

SUMMARY OF THE INVENTION

The present invention provides an improved system and method that utilizes different types of computer cards in a telecommunication network node in order to provide optimal performance and quality of service. Several types of computer cards may co-exist with different purposes and responsibilities. In a typical situation, there are four major types: Processing Cards (PCards), Line Cards (Lcards), Distribution Cards (Dcards) and System Cards (Scards). The present invention also provides different methods for interconnecting the different cards in the telecommunication node in order to provide optimal information sharing and performance.

In one example, a method and system is provided for routing at least one message from one or more subscribers of a communications network in a network node, the network node having a plurality of Pcards. First, at least one Pcard is designated to service messages from a predetermined set of subscribers. When receiving a message from a subscriber of the predetermined set, the Pcard that is designated for the subscriber is determined and the received message is routed to the determined Pcard.

In another example, an improved switch system is provided for routing at least one message from one or more subscribers of a telecommunication network. The switch system has a plurality of Pcards each being designated to service messages from a predetermined set of subscribers, a Dcard for receiving a message from a subscriber of the predetermined set, determining the Pcard that is designated for the subscriber, and routing the received message to the determined Pcard, wherein each Pcard accesses a localized database where profile information of the subscribers for whom the Pcard is designated is maintained.

DESCRIPTION OF THE PREFERRED EMBODIMENT

Figure 1:
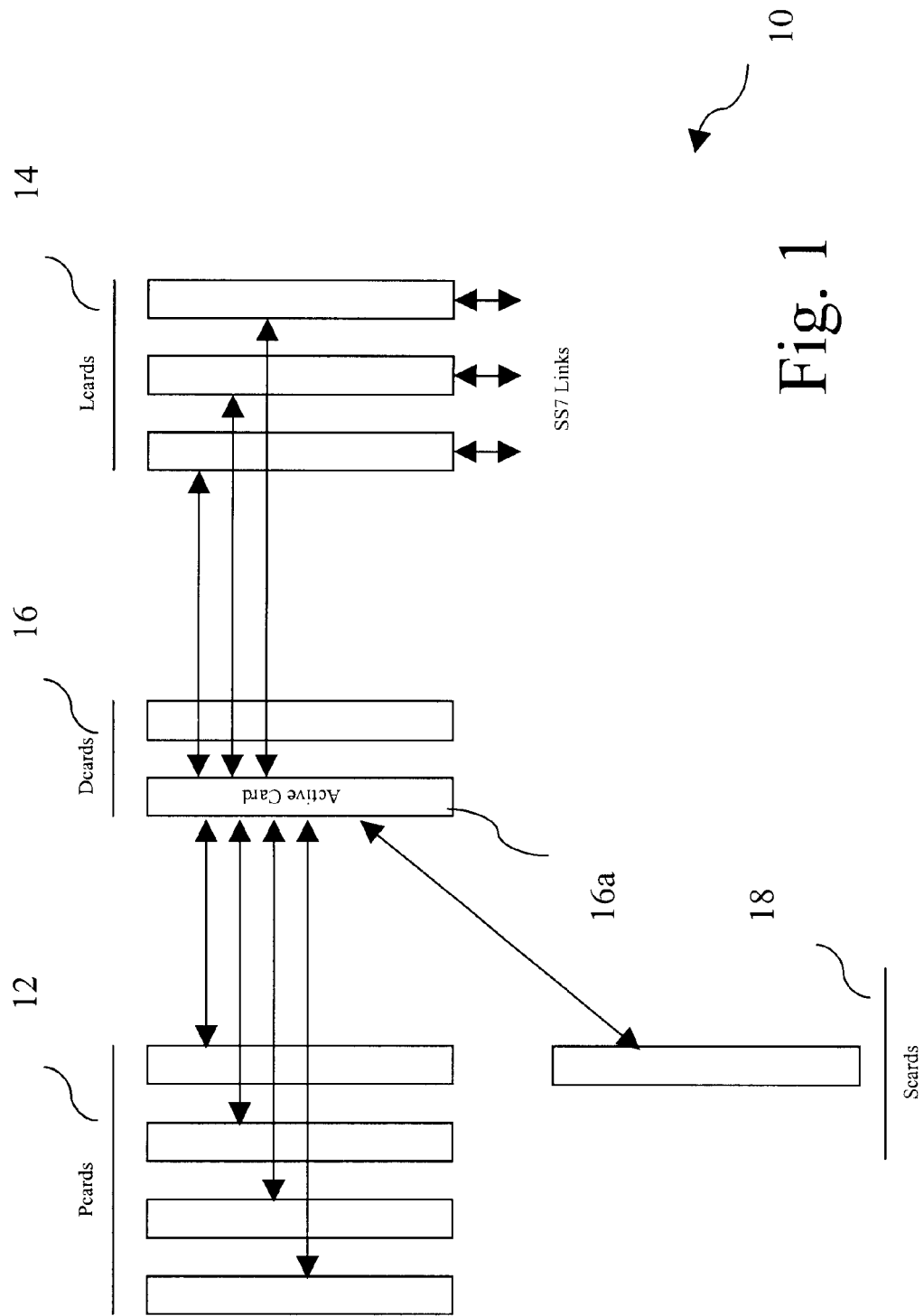
FIG. 1 illustrates a multiple-CPU-card connection architecture for a telecommunication node.

The present invention is directed to a method and system for processing load distribution for a packetized telecommunication network node. Although the following disclosure discusses a telecommunication switch and voice applications processed thereon, the present invention can apply to any type network node that requires message distribution over multiple CPU cards for processing and/or message load sharing. More specifically, it is understood that with different setting of system parameters, message types, and data formats, the present invention is equally applicable to systems for providing $2^{nd}$ and $3^{rd}$ generation wireless communication services. Furthermore, although specific process types and CPU cards are used in the following disclosure, the invention can apply to any process types with any quantity of cards.

For the purposes of illustrating the present embodiments, various acronyms are used, the definitions of which are listed below:

| | |
|---|---|
| BSSAP | Base Station System Application Part |
| BSSMAP | Base Station System Management Application Part |
| CanLocation | Cancel Location |
| CC | Connection Confirm |
| CdPA | Called Party Address |
| CIC | Circuit Identification Code |
| ConnIds | Connection ID |
| CM | Connection Management |
| CR | Connection Request |
| CRR | CM Re-establishment Request |
| CREF | Connection Refused |
| CPU | Central Processing Unit |
| Dcard | Distribution Card |
| DDF | DCard Distribution Function |
| DeleteSubData | Delete Subscriber Data |
| DTAP | Direct Transfer Application Part |
| DT1 | Data Form 1 |
| FM | Facility Manager |

-continued

| | |
|---|---|
| GPRS | General Packet Radio Service |
| GSM | Global System for Mobile communications |
| IAM | Initial Address Message |
| IMSI | International Mobile Station Identification number |
| InsertSubData | Insert Subscriber Data |
| ISUP | ISDN User Part (of SS7) |
| ISDN | Integrated Services Digital Network |
| LAI | Location Area Identifier |
| Lcard | Line Card |
| LUR | Location Update Request |
| L3 | Layer 3, network interface layer |
| MAP | Mobile Application Part |
| MO | Mobile Originated |
| MS | Mobile Station |
| MSRN | Mobile Station Roaming Number |
| MSU | Message Signal Unit |
| MM | Mobility Management |
| MSISDN | Mobile Station International ISDN Number |
| MTP3 | Message Transfer Part-Layer 3 |
| OPC | Originating Point Code |
| Pcard | Processing Card |
| PD | Protocol Discriminator |
| ProvideRN | Provide Routing Number |
| ProvideSubInfo | Provide Subscriber Data |
| REL | Release |
| RLC | Release Complete |
| RLSD | Released |
| Scard | System Card |
| SCCP | Signaling Connection Control Part. An SCCP message may carry BSSMAP, DTAP, TCAP or MAP messages. |
| SIO | Service Information Octet |
| SM | Session Manager |
| SSN | Sub-System Number |
| SS7 | Signaling System No.7 |
| TCAP | Transaction Capabilities Application Part |
| Tcard | Separate Card for maintaining information to support DDF functionality |
| TMSI | Temporary Mobile Station Identification |
| UTD | Unit Data |
| VLR | Visitor Location Register |

FIG. 1 illustrates a multiple-CPU-card connection architecture for a switch system 10. Several types of CPU cards co-exist in a switch with different purposes and responsibilities. In a typical situation, there are four major types: Processing Cards (PCards) 12, Line Cards (Lcards) 14, Distribution Cards (Dcards) 16 and System Cards (Scards) 18. In this configuration, an active Dcard 16a communicates with multiple Pcards 12 and Lcards 14, while the Lcards are connected to external lines such as SS7 links. The active Dcard 16a is also connected to an Scard 18. In the system presented herein, a distribution function is located primarily in the Dcard, and it is sometimes referred to as the DDF which stands for Dcard Distribution Function. It is understood that although that the Dcards are used as examples for illustrating the present invention, the distribution function described below can be implemented in any card that need to distribute messages to other cards in a general telecommunication node.

In one example of the present invention, it is important for the switch system to be aware of the profile information (e.g, locations) of wireless users/subscribers. In conventional wireless communication systems, the switch system can access a visitor location register (VLR) where the profile information about wireless subscribers is stored and updated periodically. A single Pcard is used in the switching system to process all messages for all subscribers associated with the switch system. Since there is only one Pcard involved, there is no need for message routing because all messages are destined to end up on the same Pcard. Therefore, for this design, a single VLR can be maintained with the switch system and accessed by the Pcard when required. However, the drawback for this configuration is that if the Pcard is overloaded, it can lead to long processing delays and even a disruption of the switch system. Additionally, this configuration limits the switch capacity and therefore makes it a non-scalable product. When a larger number of subscribers in the area need to be supported by the switch, the single Pcard capacity can be easily exceeded.

As an alternative, multiple Pcards are introduced. In a conventional switch system using multiple Pcards, a given Pcard is designed to be associated with a set of active calls. That is, all messages related to the same call are sent to the same Pcard, and a single VLR is located outside the Pcards and maintained independently. Again, the VLR is shared by all the Pcards to access user specific profiles. As the number of subscribers increases, the VLR services become more and more in demand, thereby putting a higher processing stress on the VLR. With the list of the registered subscribers in the VLR increases, a longer search time is required, which further leads to the degradation in the switch performance. With this configuration, an additional delay is caused in processing calls for the same subscriber. For example, when a subscriber engages in multiple calls, each call being handled by different Pcards, in order to keep track of all calls and activities of a given subscriber as required by the telecommunication standard, signaling messages must be transmitted between multiple Pcards. This will introduce additional delay, and obviously, as the activities per subscriber increases, the delay becomes longer.

In another embodiment, multiple Pcards are used with multiple VLRs. Each Pcard will be associated with a set of subscribers, and all messages sent to and from a particular subscriber are directed to a designated Pcard. In such a configuration, the VLR and the profile information for the set of subscribers assigned to the same Pcard are stored and maintained on the corresponding Pcard.

In the following description, voice applications are used as an example to demonstrate the operation and function of the switch system according to the teachings of the present invention. The messages required to support the voice applications used in the example are compliant to the GSM/GPRS wireless standards. Two distribution algorithms are described below, which introduce a new and unique method for routing an SCCP and ISUP message respectively. The concepts of the algorithms can apply to messages of other messages types, although some of the details of the algorithms explained here may apply only to SCCP and ISUP messages.

The present telecommunication system uses messages typically composed of two parts: a header part (or simply "header") and a user data part (or "payload"). The header contains several parameters indicating, describing, or defining the meaning of the payload. For example, the header can include a mobile identification number to which the message was sent from, and the length of the payload section etc. Within the payload, another message can be embedded. In general, all message contents are encoded and can only be read after a decoding process.

Figure 2B:
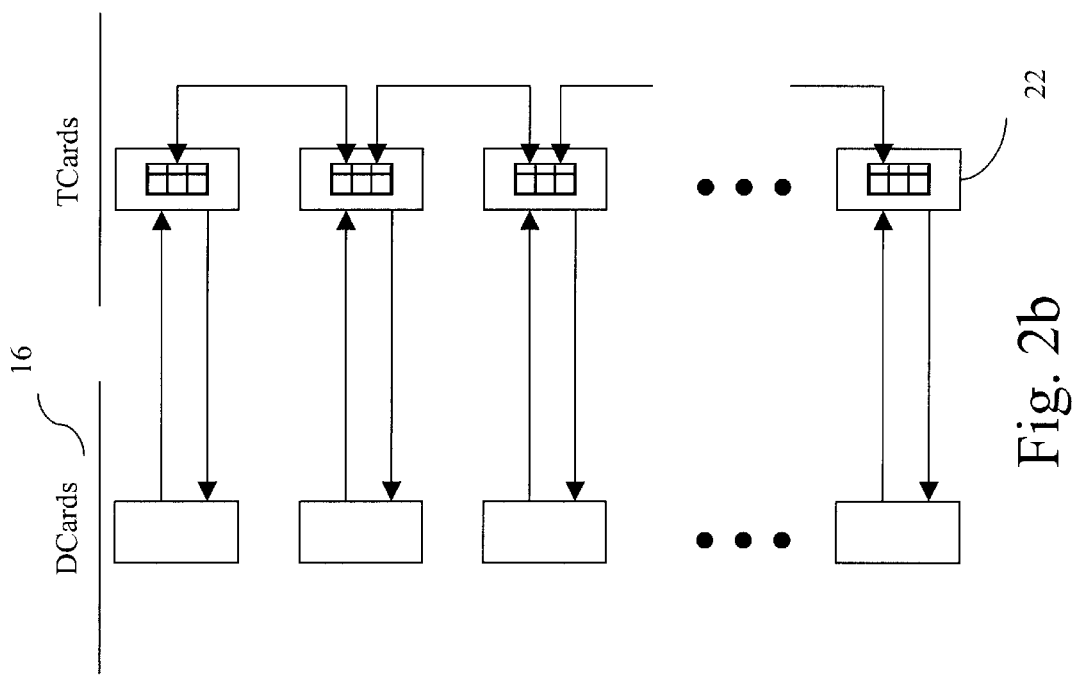
FIG. 2b illustrates a graphical representation of multiple Dcards each interconnecting with a Tcard wherein the statistical tables locate in the Tcards and interconnect therebetween.
Figure 2A:
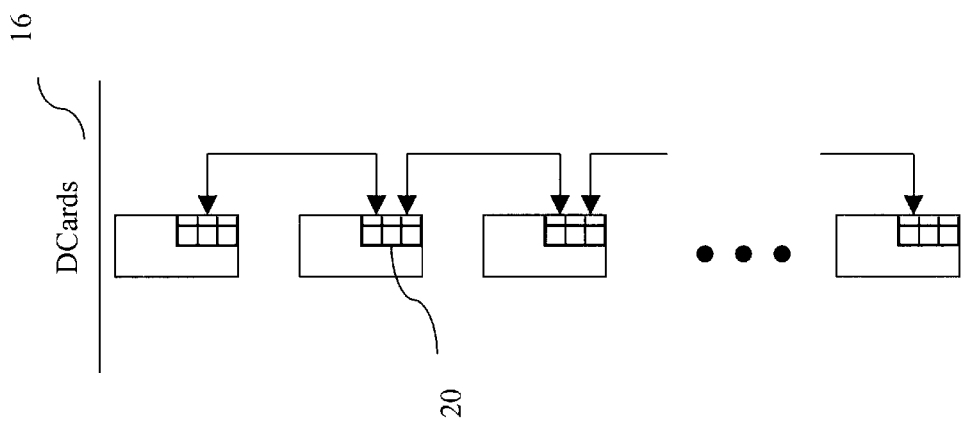
FIG. 2a illustrates a graphical representation of multiple Dcards, each with a statistical table, and the interconnection of the statistical tables between different Dcards.

FIGS. 2a–2b illustrate graphical representations of multiple Dcards 16 of the switch system of FIG. 1. In FIG. 2a, inside of each Dcard, a duplicated copy of a common database 20 such as tables for supporting DDF (e.g., DDF_Routing_Table) is embedded. As an alternative, in FIG. 2b, a database system can be installed on a separate card 22 (e.g., Tcards) to maintain such Tables. Each of these Tcards is associated with one or more Dcards. All the tables are replicated among all Tcards.

Figure 3:
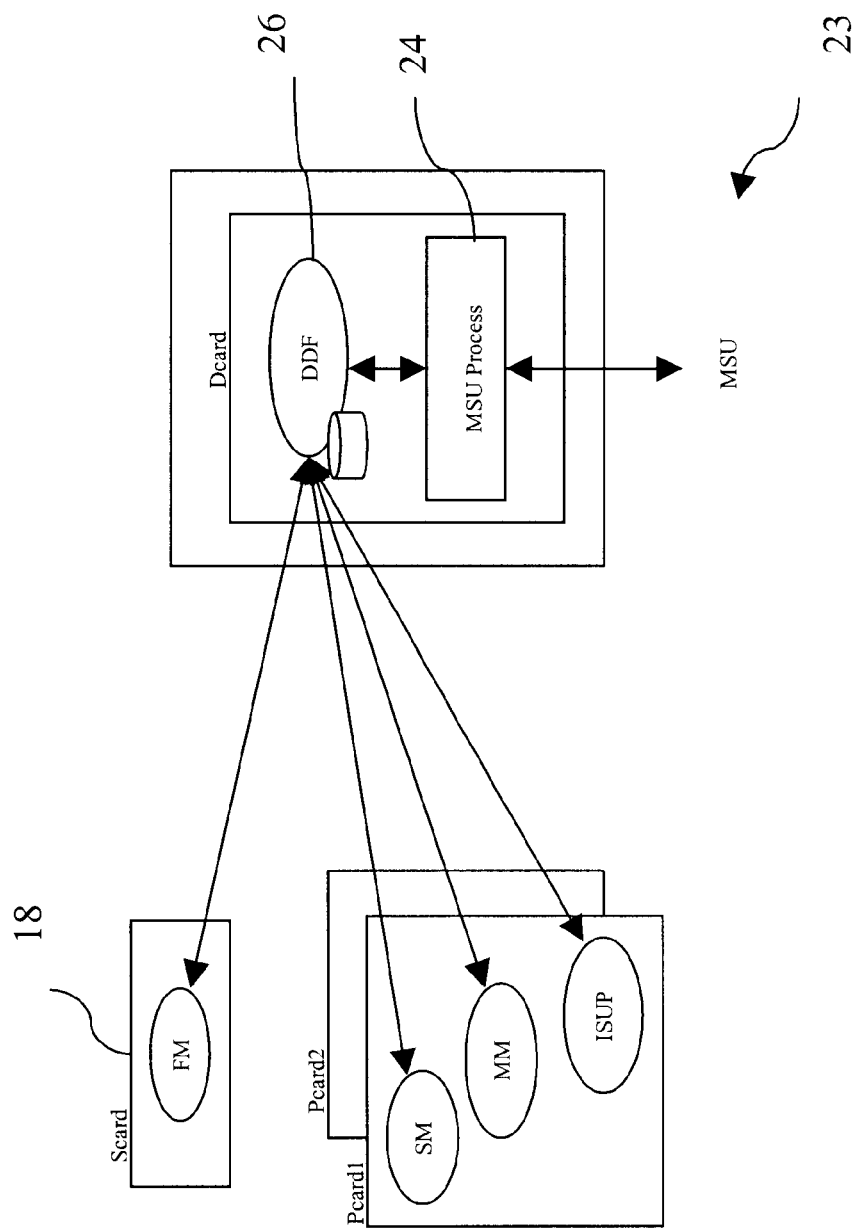
FIG. 3 depicts a schematic for illustrating a two-level routing mechanism using statistical tables located in the Dcard.

For supporting the DDF, two levels of routing decisions exist. The first one decides which Pcard an incoming message should be routed to. Once the Pcard is clearly identified, the second decision chooses a predetermined process on the Pcard for the message to be routed to based on the message type. FIG. 3 depicts a schematic 23 for illustrating the two levels of message routing using statistical tables located in the Dcard. In a Dcard, a set of statistics about each subscriber that is requesting or receiving wireless services will be stored and maintained in a format of a table. This statistic table is duplicated on each Dcard. Moreover, a distribution program is contained in the DDF module 26 on each Dcard, the functional purpose of which is to efficiently route (or distribute) incoming messages from the Lcards to appropriate Pcards and Scards in such a way that the load is fairly distributed, and each message is efficiently routed to the correct card. Embodied in the distribution program, an algorithm is implemented to route a large number of messages from any Dcard to an appropriate Pcard so that minimum processing time is consumed at the Dcard, and the messaging load is evenly distributed over the multiple Pcards. More importantly, it offers efficient scalability towards higher system capacity. In this configuration, an MSU process 24 on the Dcard16 does some pre-processing to all MSU messages coming into the Dcard before passing them to a DDF module 26.

When an incoming message from the MSU process 24 is received by the DDF module 26, the DDF module decodes the message and runs the distribution program to route the message to a specific Pcard (e.g., Pard1 or Pcard2) based on the principle of forwarding all messages belonging to the same subscriber to the same Pcard. Running on the Pcard are various processes such as SM, MM, or ISUP. The DDF module 26 also communicates with an appropriate process on the Scard such as the FM.

In the following description, the distribution methods for SCCP and ISUP messages are described. And it is understood that the SCCP message may carry BSSMAP, DTAP, TCAP or MAP message in the data part. To determine whether the message is an SCCP or ISUP message, the DDF 26 first decodes the service information octet (SIO) portion of the message. As it is understood in the industry, the SCCP messages provide two types of services: connection-oriented and connectionless. The DDF 26 decodes the header of an SCCP message to determine the SCCP message type.

Based on these two different types of SCCP services, the DDF module 26 implements routing mechanisms to distribute incoming messages to the specific process on an appropriate Pcard or Scard.

Figure 4A:
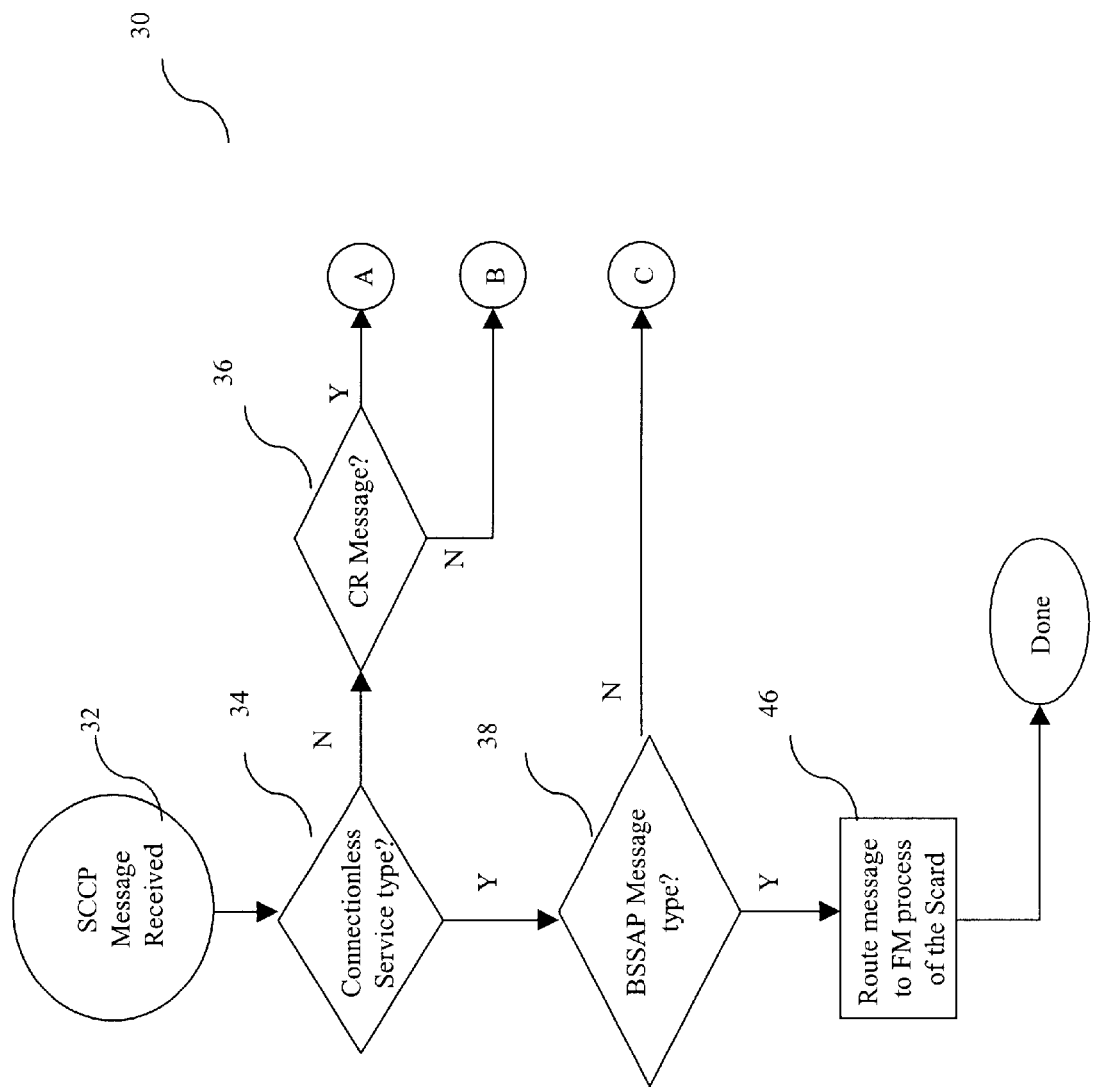
FIGS. 4a, 4b, 4c, 4d and 4e illustrate a flow diagram explaining a routing mechanism according to one example of the present invention.

FIGS. 4a, 4b, 4c, 4d and 4e illustrate a flow diagram 30 explaining a routing mechanism according to one example of the present invention. Referring to FIG. 4a, when an SCCP message is initially received in step 32, it is first determined whether it is a connectionless service type (34). If it is not, it is further determined whether the received SCCP message is a Connection Request (CR) message (36). If so, the DDF module decodes the data part of the SCCP message to extract the IMSI (International Mobile Station Identification number) or TMSI (Temporary Mobile Station Identification number) of the actual message that the SCCP message carries. The actual message can be Location Update Request, CM Service Request (MO), Paging Response, CM Reestablishment Request, or IMSI Detach messages. Although the flow diagram shown in FIG. 4a is terminated at a node "A", this process will be continued and described later in detail with regard to FIG. 4b. If it is not a CR message, further processing of the message will be described in detail with regard to FIG. 4c continuing from node "B" of the flow diagram in FIG. 4a. Assuming in step 34, the SCCP message is determined to be of a connectionless service type, it is understood that all SCCP connectionless messages are of the UDT type. In step 38, in order to determine whether it is a TCAP/MAP or BSSAP message that is embedded in the received SCCP message, the DDF module 26 will decode, based on the UDT format, the called party address to get a subsystem number (SSN) as shown in Table 2 below:

TABLE 1

| SSN (Hex) | Subsystem |
| --- | --- |
| 07 | VLR (MAP) |
| 08 | MSC (MAP) |
| FE | BSSAP |

If in step 38, the received SCCP message is a TCAP/MAP type, further processing of the message will be described in FIG. 4d continuing from node "C" of the flow diagram in FIG. 4a. If back in step 38, a BSSAP message is found, the DDF module 26 will route it to an FM process on the related Scard in step 46. The routing is thus completed (48).

Figure 4B:
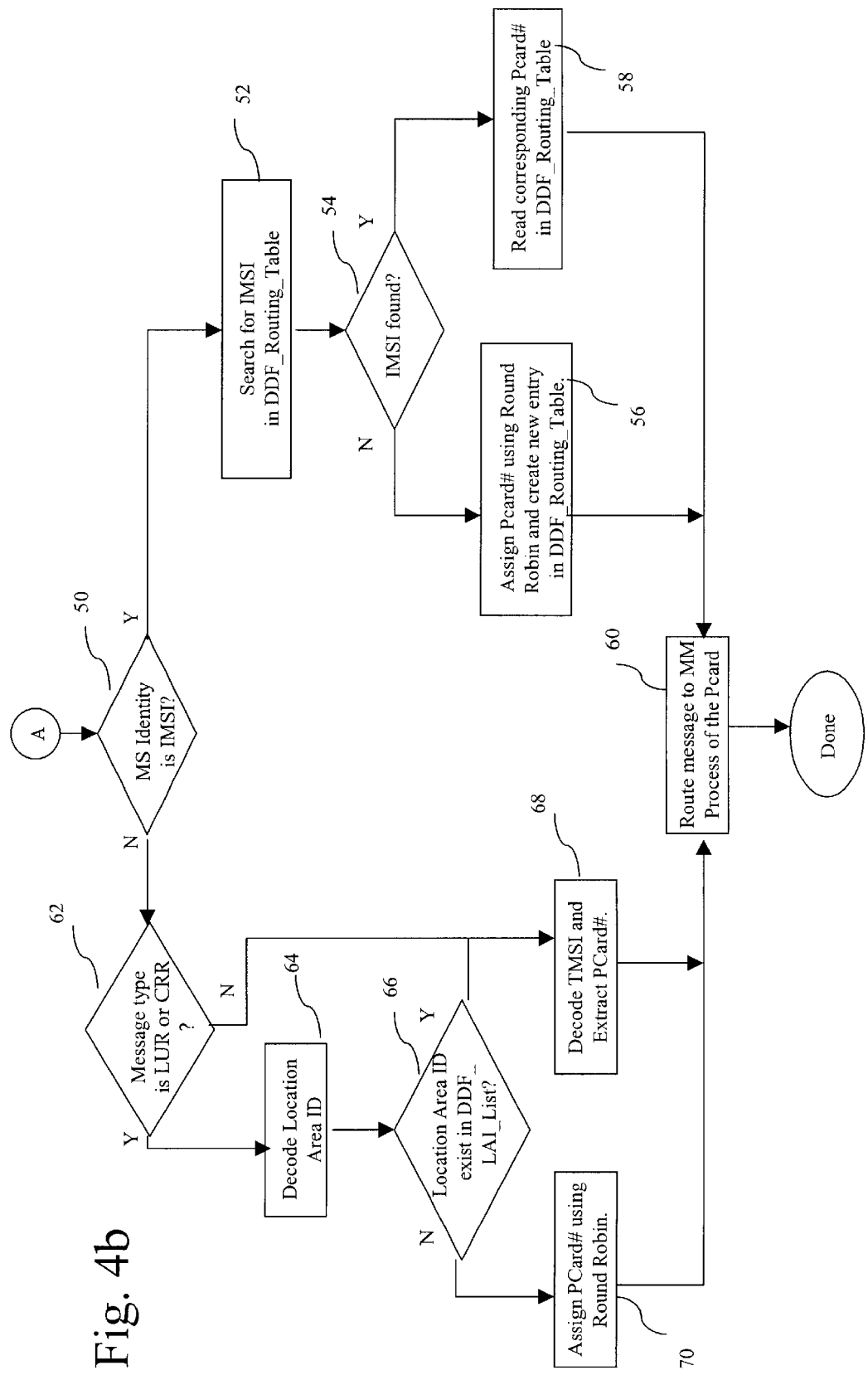

Continuing from node A in FIG. 4a, the flow diagram 30 continues in FIG. 4b by checking whether the MS Identity parameter in the SCCP message is an IMSI in step 50. If it is an IMSI, the DDF module 26 searches the IMSI in a DDF_Routing_Table (step 52). The DDF_Routing_Table contains elements or identifiers as shown in Table 3 below.

TABLE 2

| IMSI | Pcard # | Dflag | Timestamp |
| --- | --- | --- | --- |

As shown above in Table 2, the elements are added in the table as more Pcard numbers are assigned to specific IMSI's. A table format is used as an example in the present invention to store the information elements as well as to map one information element to another, but the invention can apply to any storage and maintenance system or database.

A determination is made in step 54 after the search is completed to see whether the IMSI is found. If the IMSI is not found in the DDF_Routing_Table, the DDF designates an available Pcard through a predetermined selection process to route the message to and stores the IMSI and the Pcard number with a current timestamp to the DDF_Routing_Table as a new entry (56). The Pcard selection process can utilize selection algorithms such as the Round Robin method or any other similar load sharing algorithms. On the other hand, if the IMSI is found in the DDF_Routing_Table, the DDF then gets the Pcard number of the found record to route the message to in step 58, and immediately updates the timestamp in the table as well. From either step 56 or 58, the SCCP message is then routed to an appropriate Pcard. As mentioned briefly above with regard to FIGS. 2a–2b, the DDF_Routing_Table is stored and maintained in the Dcard or Tcard.

Back in step 50, if it is not an IMSI that is received in the message, a further check is conducted in step 62 to see whether an L3 message that the SCCP message carries is a type of either Location Update Request (LUR) or CM Reestablishment Request (CRR). If the L3 message is not of any of the two types, the DDF decodes the TMSI from which a predetermined Pcard number is extracted in step 68. On the other hand, if the L3 message in step 62 is of either LUR or CRR type, the DDF module decodes the Location Area Identifier (LAI) of the actual L3 message in step 64. Then the DDF module tries to find the LAI from a DDF_LAI_List in step 66. The DDF_LAI_List contains a list of all the Location Areas Identities that the switch is assigned for service. This list is provisioned by the network operator at the time of the wireless system deployment. If the LAI is found in the list, in such a case, the message is IMSI Detach, CM Service Request, or Paging Response message, and the TMSI is decoded and a predetermined Pcard number is extracted in step 68. If the LAI is not found in the DDF_LAI_List, an available Pcard will be assigned using a selection process in step 70. Such a process is similar to the process done in step 56. Coming out from either step 68 or 70, the message is then routed to the MM process on an appropriate Pcard.

Figure 4C:
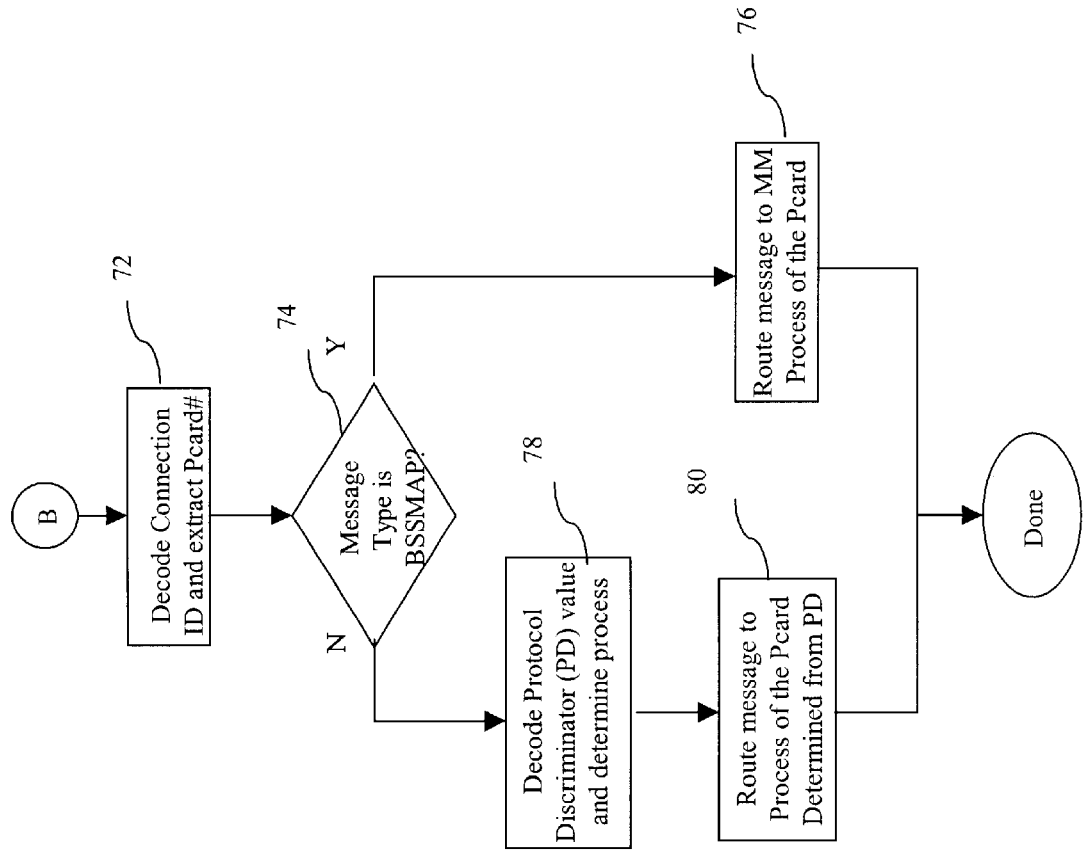

Referring to FIG. 4c, as continued from FIG. 4a at node B, if the received SCCP message type is not of a CR type (such as CC, CREF, RLSD, RLC, or DT1), the DDF module will use the Connection ID (ConnId) that the SCCP message provides to assist routing the message. In one example of the present invention, the ConnIds are used as a base to generate unique numbers that are used as the Pcard numbers to which the message will be forwarded. Since there is a one-to-one relation between a ConnId and a Pcard number, the ConnId can be decoded and the Pcard number can be found in step 72. Once the Pcard number is identified, the DDF module needs to further determine what process on the Pcard to forward the message to. First, it identifies whether the message is either BSSMAP or DTAP in step 74. The DDF module decodes a section of the payload of the SCCP message where the encoded value will identify the message type as follows:

| Value: | 1 | DTAP |
|---|---|---|
|  | 0 | BSSMAP. |

If it is a BSSMAP message, the DDF module routes the message to the MM process in step 76. For DTAP messages, the DDF module further decodes the payload of the SCCP message to get to its L3 message so that the DDF module can extract a Protocol Discriminator (PD) value (step 78), which indicates a process for the message to be routed to. The message is then routed to the appropriate process on the determined Pcard (step 80).

Figure 4D:
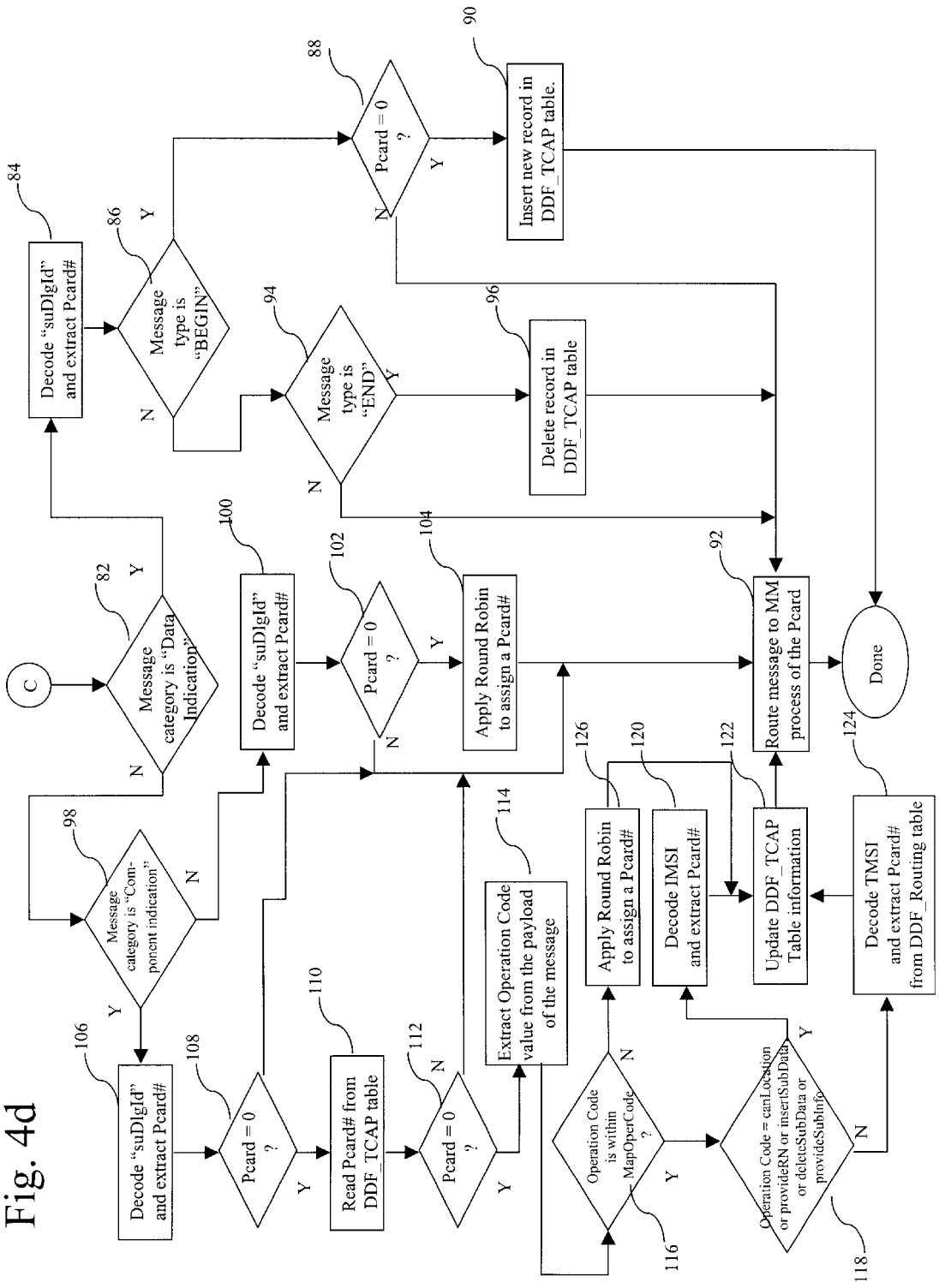

Referring now to FIG. 4d, as continued from FIG. 4a at node C, the routing mechanism for TCAP/MAP messages makes use of the message information carried in the message header and the payload. If it is determined that the message belongs to the message category of "Data Indication" in step 82, the parameter suDlgId is decoded and the Pcard number is extracted in step 84. If the message type is determined to be a BEGIN message in step 86, it is checked to see whether the Pcard number is zero in step 88. If it is, a new record is inserted to a DDF_TCAP table in step 90. If it is not, the message is routed to the MM process of the Pcard in step 92. Back in step 86, if the message is not of a BEGIN type, it is further examined to see whether the message is of an END type (step 94), if it is, the record is deleted from the DDF_TCAP table in step 96. After the deletion or after it is determined that the message is not of the END type, the message is routed to the MM process of the Pcard in step 92.

If back in step 82 wherein the message does not belong to the Data Indication category, it is then determined whether the message belongs to a "Component Indication" category (step 98). If it is not, the parameter suDlgId is decoded and the Pcard number is extracted in step 100, and the Pcard number is checked to see whether it is zero in step 102. If so, a card selection mechanism such as a Round Robin process is called to assign an available Pcard number to the message in step 104. On the other side, if back in step 102, there is a Pcard number existing, step 92 will be executed.

Back in step 98 when the message is determined as belonging to a Component Indication category, same as step 100 and 102, the parameter suDlgId is decoded and the Pcard number is extracted (step 106) and checked (step 108). If the Pcard number is zero, a corresponding Pcard number is read from the DDF_TCAP table in step 110, and if it is not zero (step 112), the step 92 is executed to route the message to the MM process of the identified Pcard.

If the DDF_TCAP table still does not identify a Pcard, the DDF module extracts an Operation Code from the data section of the message in step 114. It is further checked to see whether the extracted Operation Code is within a predetermined range referred to as MapOperCode (step 116). If so, it needs to be determined whether the value extracted refers to "Cancel Location," "Provide Routing Number," "Insert Subscriber ID," "delete Subscriber ID," or "Provide Subscriber ID," each of which is represented by a predetermined code (step 118). If the extracted value falls in any one of the above listed number, the DDF module decodes the IMSI from the message header and looks into the DDF_Routing_Table for a record for that particular IMSI. If a record is found, the corresponding Pcard number is selected from the DDF_Routing_Table (step 120), the DDF_TCAP table is updated (step 122), and the message is sent to the MM process of that Pcard (92). If a record is not found in the DDF_Routing_Table, the DDF module designates a Pcard number through a predetermined selection process to route the message to and inserts a new record in the DDF_Routing_Table. The message is thereafter sent to the MM process of the selected Pcard (step 92).

If in step 118 where the extracted Operation Code is found to be one other than those listed above such as a number for "Destination Transaction," the DDF module will read the TMSI from the message header and extracts the Pcard number from the DDF_Routing_Table (step 124). The DDF_TCAP table is then updated (step 122), and the message is then routed to the MM process of that Pcard (92).

Further back in step 116 where the Operation Code is found not within a predetermined range, the DDF module designates a Pcard 126 through a predetermined selection process such as a Round Robin process, and routes the message to a corresponding Pcard (step 92) with a new record inserted in the DDF_Routing_Table (step 126).

Figure 4E:
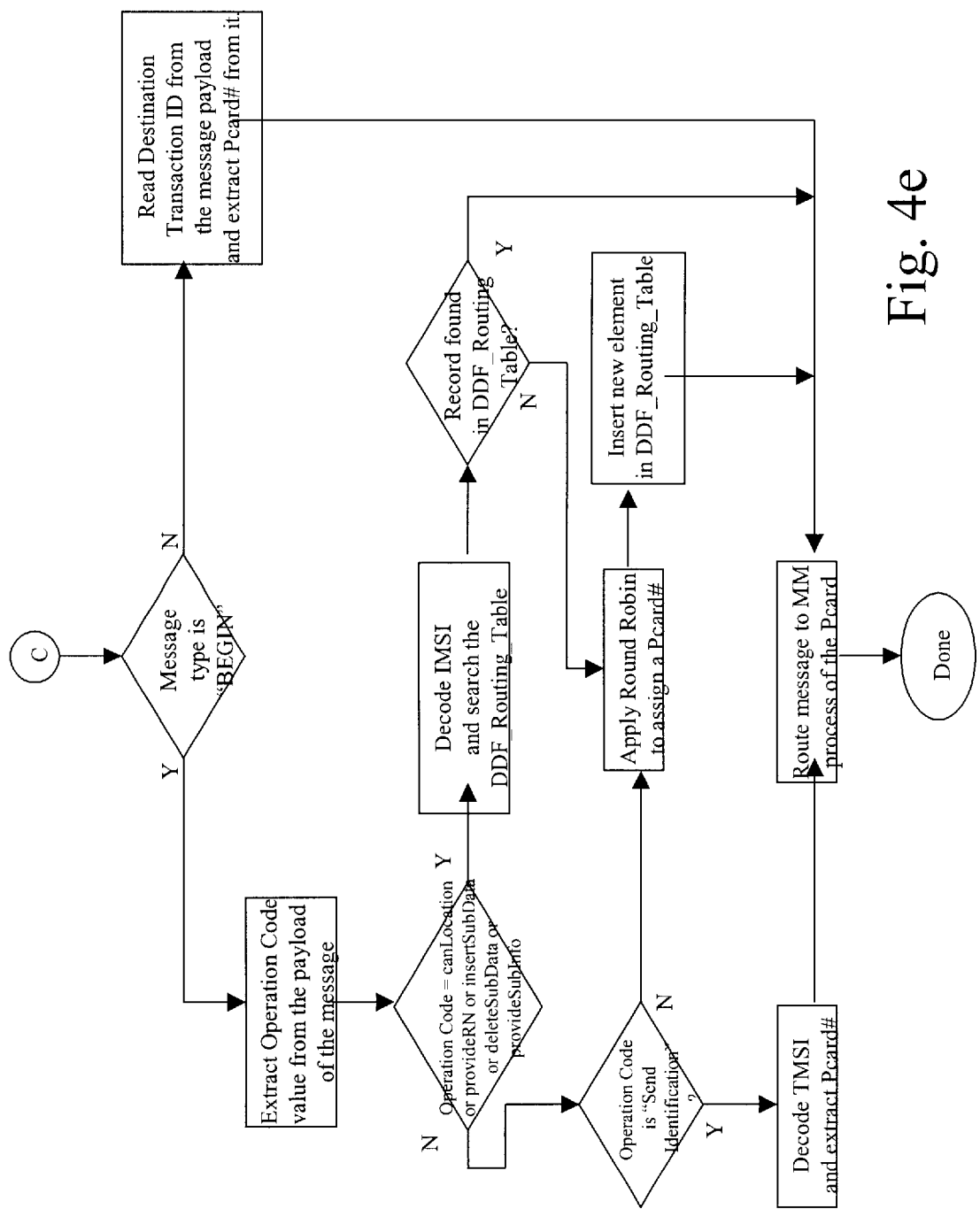

As an alternative to FIG. 4d, FIG. 4e illustrates another method for identifying the Pcard number for the branch of the flow diagram 30 extending from node C. In this embodiment, the routing mechanism for TCAP/MAP messages make use of the message information carried in the message header and the payload. In step 130, if the message is determined not to be a BEGIN message, a Destination Transaction ID is read from the payload of the message, and the Pcard number is extracted therefrom (step 132). The message is going to be routed to the found Pcard in step 134.

On the other hand in step 130 when the message is determined to be of a BEGIN type, in step 136, the DDF module extracts an Operation Code from the payload of the message. If the Operation Code extracted refers to "Cancel Location," "Provide Routing Number," "Insert Subscriber ID," "delete Subscriber ID," or "Provide Subscriber ID" (step 138), the DDF module then decodes the IMSI from the message header and used the IMSI as an index to search for a predetermined record in the DDF_Routing_Table (step 140). If such a record can be found (step 142), a corresponding Pcard number in the record is selected, and the message is sent to the MM process of the designated Pcard (step 13). If a record can not be found in the DDF_Routing_Table in step 140, the DDF module designates a Pcard number in step 144 through a predetermined selection process (e.g., a Round Robin process). The DDF module then inserts a new record in the DDF_Routing_Table reflecting the designation of the Pcard to the message/subscriber (step 146), and the message is thereafter sent to the MM process of the selected Pcard (step 134).

Back in step 138, if the extracted Operation Code is not one of "Cancel Location," "Provide Routing Number," "Insert Subscriber ID," "delete Subscriber ID," and "Provide Subscriber ID," and it is further determined that it refers to a "Send Identification" or "Destination Transaction" (step 148), the DDF module, in step 150, reads the TMSI from the message header and extracts the Pcard number therefrom in the same fashion used to extract Pcard number from the ConnId as described earlier with regard to FIG. 4c. The message is then routed to the MM process of that PCard. In cases where the Operation Code does not refer to one of the above described parameters, the DDF will designate a Pcard number through a predetermined selection process to route the message to and inserts a new record containing the Pcard information in the DDF_Routing_Table.

For ISUP messages, they can be categorized as call related and non-call related messages. With the understanding that all call related messages for a particular call instance begins with an IAM message, it is thus very easy for the DDF module to identify whether it is a call-related or non-called related ISUP message by decoding the first byte of ISUP message. Based on these two different types of ISUP messages, the DDF implements routing mechanisms to distribute incoming messages to specific processes on the Pcards or Scards. Many call-related ISUP message types are well known in the industry.

It is understood that both the Pcard number and the Process ID are not part of the 2.5G and 3G standards, but the standards allow the network to assign the TMSI value to the MS. Therefore, the Pcard number and Process ID are encoded as part of the TMSI parameter when the TMSI is initially created.

Figure 5:
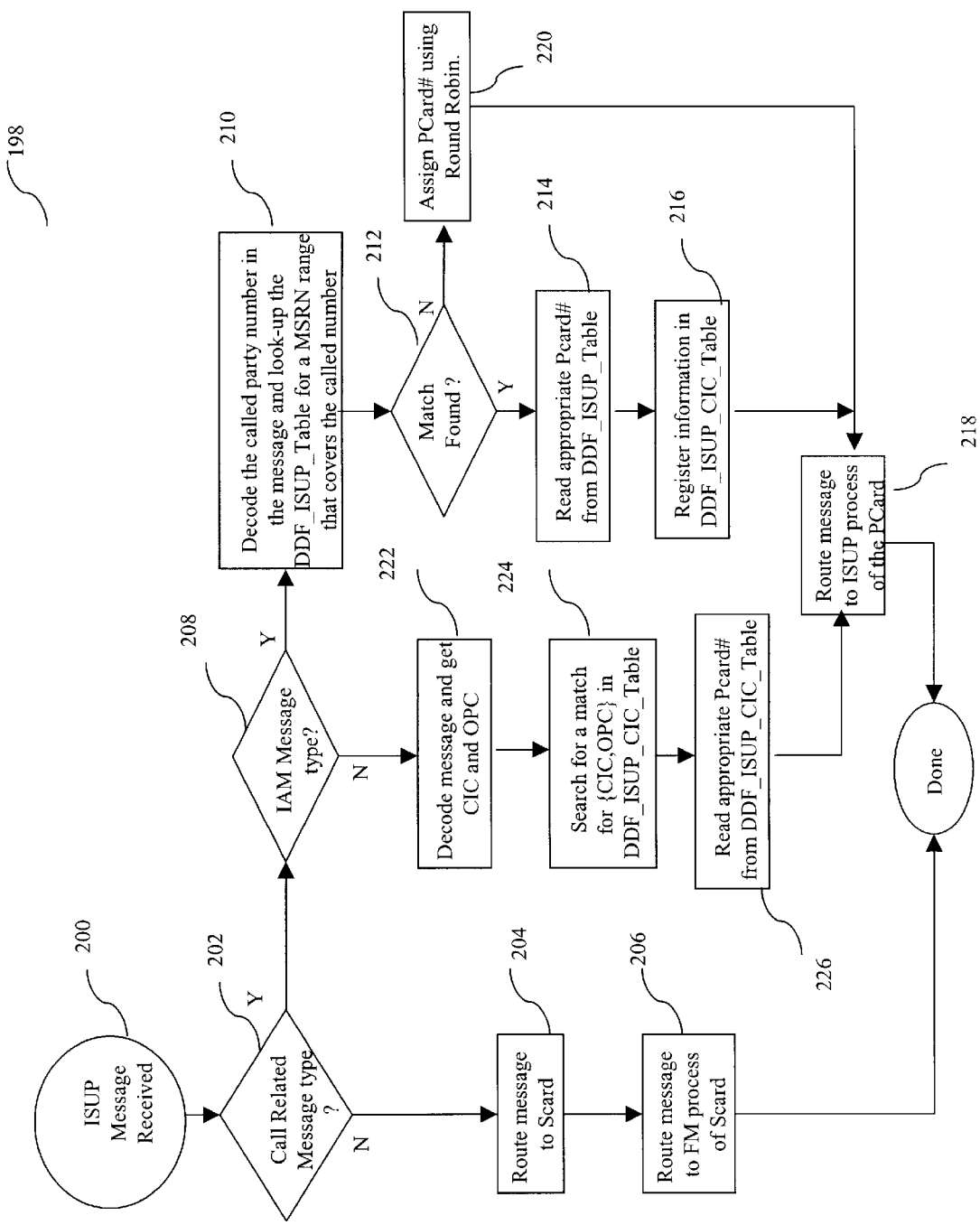
FIG. 5 illustrates an ISUP message routing mechanism according to one example of the present invention.

FIG. 5 illustrates an ISUP message routing mechanism 198 according to one example of the present invention. When an ISUP message is received at step 200, it is first checked to determine whether it is of a call related message type in step 202. If it is a non-call related ISUP message, the DDF routes it to the Scard, and further to the FM process thereon (steps 204 and 206).

If back in step 202, the message is determined to be of a call related message type, step 208 checks whether it is an IAM message. If it is one, in step 210, the DDF module decodes the called party number in the message, and then looks up a DDF_ISUP_Table (a sample is shown below as Table 5) to find if the number is within a Mobile Station Roaming Number (MSRN) range (step 212), which further corresponds to a Pcard. The DDF_ISUP_Table and a DDF_ISUP_CIC_Table are stored and maintained in the Dcard or Tcard. If a Pcard has been found in step 212, the DDF module reads the Pcard number from the table (step 214), and inserts a record of MSRN, CIC, OPC and the Pcard number to a DDF ISUP_CIC_Table (a sample of which is shown in Table 6 below) in step 216. The DDF module then forwards the message to the identified Pcard in step 218.

If no record has been found matching in the DDF_ISUP_Table in step 212, it means that the number is a non-MSRN (e.g. MSISDN). Similar to the Pcard selection process described above, the DDF module may use a Round Robin algorithm to designate a Pcard for the message to be routed in step 220. Moreover, the DDF module will insert the call party number, along with CIC, OPC and the Pcard number to the DDF_ISUP_CIC_Table.

TABLE 3

DDF_ISUP_Table

| MSRN Min | MSRN Max | Pcard# |
|---|---|---|

TABLE 4

DDF_ISUP_CIC_Table

| MSRN/MSISDN | CIC | OPC | Pcard# |
|---|---|---|---|

Once the DDF_ISUP_CIC_Table is established, all call-related messages for a particular call instance followed by the IAM can be routed to the same Pcard by decoding the message to obtain the CIC and OPC (step 104), matching CIC and OPC in the DDF_ISUP_CIC_Table (step 106), and reading an appropriate Pcard number (step 108) for routing the message to a predetermined ISUP process on the designated Pcard. When a Release (REL) or Release Complete (RLC) ISUP message is received, the DDF module decodes the message to get the CIC and OPC, and then match them in the DDF_ISUP_CIC_Table. Since they are of no further use for routing the messages, the DDF module deletes the record found from the table.

As an example being described above, the DDF module has the responsibility to distribute the ISUP and SCCP messages on multiple Pcards. It is understood that that the DDF can distribute messages of any protocols and related control messages. Although the details of various protocols differ from each other, the principle of the present invention can be readily implemented by one skilled in the art.

In summary, the present invention presents a unique architecture and arrangement of the CPU cards, which play a critical role in determining the scalability of the network entity, without sacrificing the efficiency thereof. In one example, having multiple Pcards associated with different subscribers (instead of calls) centralizes the control over a subscriber's activities on one Pcard, wherein no further messaging is required between Pcards to share a given subscriber's call status. Therefore, the processing efficiency is improved by eliminating the inter-Pcard messaging traffic. The present invention also minimizes the processing load on each Pcard. This is achieved by evenly distributing the incoming message load on all the Pcards. A distribution mechanism is implemented in a Dcard to distribute the load on the Pcards. In order to further improve upon the processing efficiency, a VLR-like database is stored and maintained in each Pcard instead of having all Pcards sharing a global VLR. Each VLR-like database on the Pcard handles only the subscribers assigned to that Pcard, thereby centralizing the information of a given subscriber on the same Pcard and allowing the VLR services to be requested and extracted on the same Pcard without communicating with other cards. The present invention also maintains statistical tables containing information about which active subscriber belongs to which Pcard. The tables are stored and maintained in the Dcard, and they are used by the distribution mechanism to route incoming messages to the appropriate Pcard.

Given that every Dcard has a limited capacity for processing messages, multiple Dcards can be used to support a larger number of messages, therefore more subscribers. For proper routing messages onto the Pcards, the statistical tables may be duplicated in each Dcard. For a better scalability performance, as the number of Dcards increases, the statistical tables can be located and maintained on separate cards such as Tcards where their duplications are done among Tcards and the statistics update is done upon a Dcard's request. This eliminates the processing time to duplicate the tables in a Dcard, therefore increasing the number of Dcards linearly with the number of subscribers. That is, given that the table replication process is handled by a different card, the Dcard capacity does not degrade as the number of Dcards increases to accommodate larger number of subscribers.

The concepts presented in the present invention are implemented using software and hardware. For example, the different CPU cards are hardware components of the switch, and the algorithms presented in the invention are implemented in software that is located in different CPU cards.

In short, the present invention solves various system performance and scalability problems created by traditional designs, boosts the performance of the switch, and makes it highly scalable (e.g., the number of upgrades to the switch grows linearly with the number of subscribers required for the switch to support).

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for routing at least one message in a network node of a communications network, the network node having a plurality of processing cards (Pcards), the method comprising:
designating at least one Pcard to service messages from a predetermined set of subscribers;
receiving a message from a subscriber of the predetermined set;
determining the Pcard that is designated for the subscriber; and
routing the received message to the determined Pcard wherein each Pcard contains a localized database where profile information of the subscribers for whom the Pcard is designated is maintained.

2. The method of claim 1 wherein the step of determining further includes selecting an appropriate process on the determined Pcard for processing the message based on a message type thereof.

3. The method of claim 1 further comprising assigning a predetermined Pcard for the received message if it is not associated with any designated Pcard so that a fair load sharing is achieved among all the Pcards.

4. The method of claim 1 wherein the step of determining further includes identifying whether the message is determined to include a signal connection control part (SCCP) message.

5. The method of claim 4 further comprising determining whether the message is a connection request message.

6. The method of claim 1 wherein the message is a ISDN user part (ISUP) message.

7. A method for routing at least one message in a network node of a communications network, the network node having a plurality of processing cards (Pcards), the method comprising:
designating at least one Pcard to service messages from a predetermined set of subscribers;
receiving a message from a subscriber of the predetermined set;
determining the Pcard that is designated for the subscriber wherein the step of determining further includes identifying whether the message is determined to include a signal connection control part (SCCP) message;
determining whether the message is a connection request message;
routing the received message to the determined Pcard; and
decoding an identification number for the Pcard from a temporary mobile station identification (TMSI).

8. A method for routing at least one message in a network node of a communications network, the network node having a plurality of processing cards (Pcards), the method comprising:
designating at least one Pcard to service messages from a predetermined set of subscribers;
receiving a message from a subscriber of the predetermined set;
determining the Pcard that is designated for the subscriber wherein the step of determining further includes identifying whether the message is determined to include a signal connection control part (SCCP) message;
determining whether the message is a connection request message;
routing the received message to the determined Pcard; and
searching for an international mobile station identification number (IMSI) in a routing table and identifying a corresponding Pcard associated with the IMSI.

9. A method for routing at least one message in a network node of a communications network, the network node having a plurality of processing cards (Pcards), the method comprising:
designating at least one Pcard to service messages from a predetermined set of subscribers;
receiving a message from a subscriber of the predetermined set;
determining the Pcard that is designated for the subscriber wherein the step of determining further includes identifying whether the message is determined to include a signal connection control part (SCCP) message;
determining whether the message is a connection request message;
routing the received message to the determined Pcard; and
if the message is not a connection request message, decoding a connection identifier to extract an identification number for the Pcard.

10. A method for routing at least one message in a network node of a communications network, the network node having a plurality of processing cards (Pcards), the method comprising:
designating at least one Pcard to service messages from a predetermined set of subscribers;
receiving a message from a subscriber of the predetermined set;

determining the Pcard that is designated for the subscriber wherein the step of determining further includes identifying whether the message is determined to include a signal connection control Part (SCCP) message; and routing the received message to the determined Pcard wherein the step of determining includes, if the message is an SCCP message, and it is of a connectionless service type, it is not a base station system application part (BSSAP) message, and is not of a BEGIN type, reading destination transaction identifier from the message for extracting an identification number of the Pcard to route the message.

11. The method of claim 10 further comprising decoding an international mobile station identification number (IMSI) in a routing table and identifying a corresponding Pcard associated with the IMSI if the operation code is of a first predetermined number.

12. The method of claim 10 further comprising decoding a temporary mobile station identification if the operation code is a second predetermined number.

13. A method for routing at least one message in a network node of a communications network, the network node having a plurality of processing cards (Pcards), the method comprising:

designating at least one Pcard to service messages from a predetermined set of subscribers;

receiving a message from a subscriber of the predetermined set;

determining the Pcard that is designated for the subscriber wherein the step of determining further includes identifying whether the message is determined to include a signal connection control part (SCCP) message; and routing the received message to the determined Pcard wherein the step of determining includes, if the message is of a connectionless service type, and it is not a base station system application part (BSSAP) message, and it is of a BEGIN type, extracting an operation code from the message.

14. A method for routing at least one message in a network node of a communications network, the network node having a plurality of processing cards (Pcards), the method comprising:

designating at least one Pcard to service messages from a predetermined set of subscribers;

receiving a message from a subscriber of the predetermined set;

determining the Pcard that is designated for the subscriber wherein the step of determining further includes identifying whether the message is determined to include a signal connection control part (SCCP) message;

routing the received message to the determined Pcard; and wherein the step of determining includes, if the message is of a connectionless service type, and it is a base station system application part (BSSAP) message, routing the message to a facility manager process on a system card.

15. The method of claim 14 wherein the step of determining further includes routing the message to a facility manager process on a system card if it is of a call related message type.

16. The method of claim 14 wherein the step of determining further includes identifying the Pcard by searching at least one circuit identification code table and routing the message to an ISUP process on the Pcard.

17. A telecommunications system comprising:

a plurality of processing cards (Pcards) each being designated to service messages from a predetermined set of subscribers; and a distribution card (Dcard) for receiving a message from a subscriber of the predetermined set, determining the Pcard that is designated for the subscriber; and routing the received message to the determined Pcard wherein each Pcard contains a localized database where profile information of the subscribers for whom the Pcard is designated is maintained.

18. The system of claim 17 wherein a localized database is maintained on a separate card associated with each Pcard, the separate card having profile information of the set of subscribers for whom the Pcard is designated.

19. The system of claim 17 wherein the determined Pcard further includes a predetermined process thereon for processing the message based on a message type thereof.

20. The system of claim 17 further comprising assigning a predetermined Pcard for the received message if it is not associated with any designated Pcard so that a fair load sharing is achieved among all the Pcards.

21. The system of claim 17 wherein each Dcard contains a localized database wherein routing information of the received messages is maintained.

22. The system of claim 17 further comprising a localized database maintained on a separate card associated with each Dcard, the separate card having routing information for the received message.

23. A switch for routing at least one message from one or more subscribers of a telecommunication network, the switch comprising:

a plurality of processing cards (Pcards) each being designated to service messages from a predetermined set of subscribers;

a distribution card (Dcard) for receiving a message from a subscriber of the predetermined set, determining the Pcard that is designated for the subscriber, and routing the received message to the determined Pcard; and wherein each Pcard accesses a localized database where profile information of the subscribers for whom the Pcard is designated is maintained wherein each Pcard contains a localized database where profile information of the subscribers for whom the Pcard is designated is maintained.

24. The switch of claim 23 wherein the localized database is maintained on the Pcard.

25. The switch of claim 23 wherein the determined Pcard further includes a predetermined process thereon for processing the message based on a message type thereof.

26. The switch of claim 23 further comprising means for assigning a predetermined Pcard for the received message if it is not associated with any designated Pcard so that a fair load sharing is achieved among all the Pcards.

* * * * *